United States Patent Office 2,763,084
Patented Sept. 18, 1956

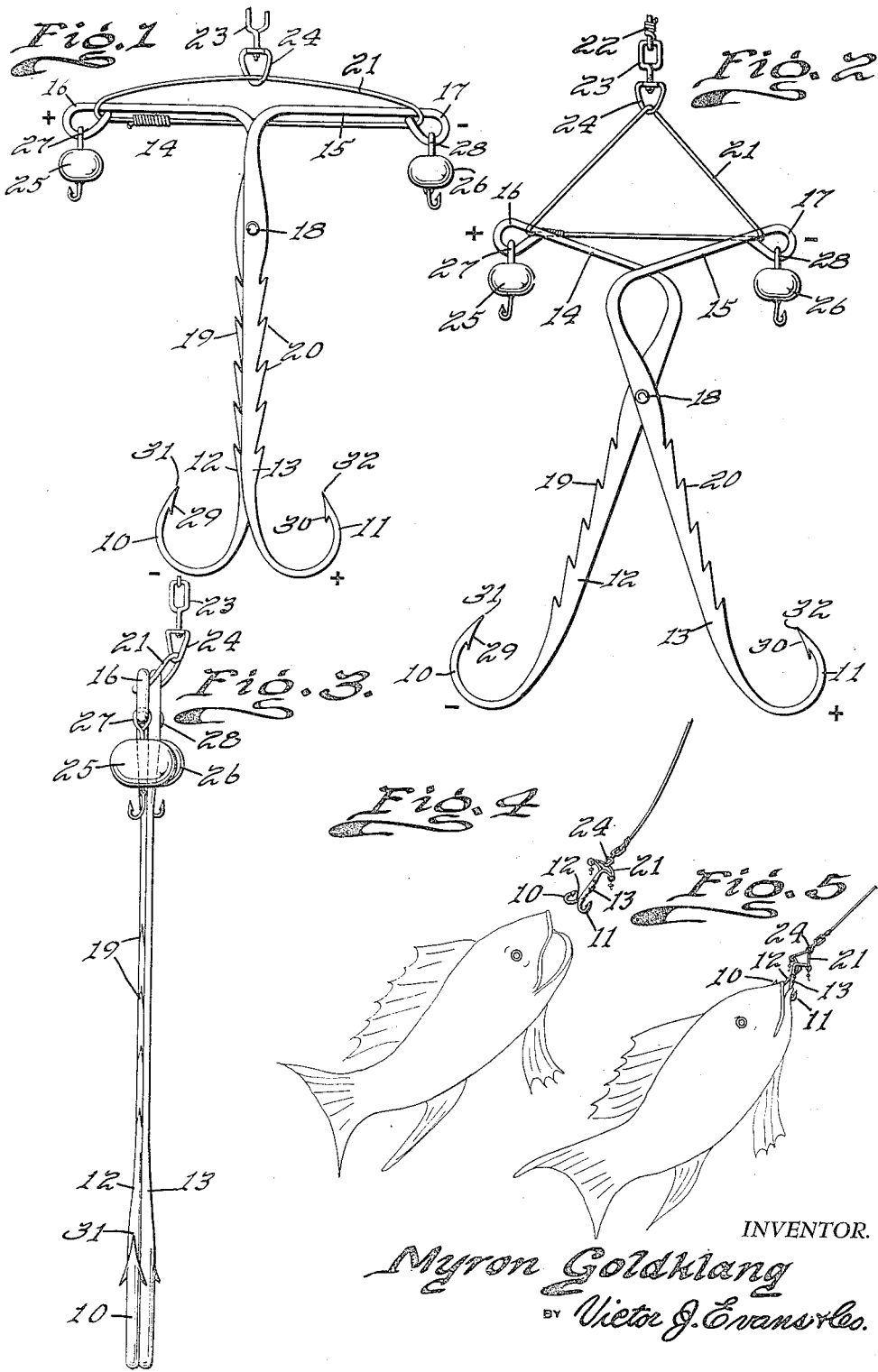

2,763,084

SELF-SETTING SNARE HOOKS

Myron Goldklang, Johnson City, Tenn.

Application May 10, 1955, Serial No. 507,334

2 Claims. (Cl. 43—37)

This invention relates to fishing tackle, and in particular, a pair of pivotally connected hooks having magnetized shanks and adapted to be connected to a fishing line with offset or laterally extended upper ends whereby a pull on the hooks, such as that resulting from a fish striking bait on the hooks, causes tension in the fishing line and the pull of the fishing line draws the offset sections at the upper ends of the hooks inwardly with the result that the hooks are snapped outwardly definitely setting the hooks in the interior of a mouth of a fish.

The purpose of this invention is to provide a combination fish hook that is actuated by a fish striking the device to cause the hook to snap outwardly.

Various types of fish hooks have been provided in pairs and the hooks of the pairs pivotally connected and provided with springing or snapping elements whereby hooks are extended as a fish strikes, however, with conventional hooks of this type a slight pull, such as that resulting from a hook striking seaweed, grass, or the like, opens the hooks and the hooks remain in the open position. With this thought in mind, this invention contemplates hooks magnetized to provide north and south poles or plus and minus portioins whereby the shanks are attracted by the magnetism inherent therein so that should the hooks become accidentally spread they will be drawn back together by the magnetism therein.

The object of this invention is, therefore, to provide pivotally connected fish hooks wherein means is provided for retaining the hooks in a closed position and wherein the hooks are attached to a fishing line in such a manner that increased tension between the fishing line and hooks spreads the hooks.

Another object of the invention is to provide a pair of pivotally connected fish hooks that are adapted to spread as a fish strikes bait thereon in which weights depending from eyes of the fish hooks coact with magnetism in the material of the hooks to urge the hooks toward a closed position.

A further object of the invention is to provide a fish lure including a pair of pivotally connected hooks in which a fishing line is attached to a cord extended through eyes on laterally extended ends of the hooks wherein a pull on the fishing line snaps the hooks outwardly in which the lure is of a simple and economical construction.

With these and other objects and advantages in view, the invention embodies a pair of fish hooks having elongated shanks with barbs on opposite edges of the shanks in which the shanks are magnetized and in which a fishing line is connected with a cord to eyes at extended ends of laterally disposed arms extended from upper ends of the shanks of the hooks.

Other features and advantages of the invention will appear from the following description, taken in connection with the drawings, wherein:

Figure 1 is a front elevational view of the improved fish lure of this invention showing the device in position for use and in which shanks of the hooks are held together with magnetism induced therein.

Figure 2 is a view similar to that shown in Figure 1 except that the fishing line is in tension and the force resulting therefrom draws extended ends of the arms of the hooks upwardly with the result that the hooks are urged outwardly.

Figure 3 is an edge view with the parts as illustrated in Figure 1 showing the hooks in a closed position.

Figure 4 is a view illustrating a fish in the act of taking bait on a hook, the hook being in the closed position, as illustrated in Figure 1.

Figure 5 is a view similar to that shown in Figure 4 showing the fish caught on the hook.

Referring now to the drawing, wherein like reference characters denote corresponding parts, the improved self-setting snare hook of this invention includes a pair of hooks 10 and 11 carried by shanks 12 and 13 with right angularly disposed arms 14 and 15 extended from upper ends and with eyes 16 and 17, respectively, on upper ends of the arms.

The shanks 12 and 13 of the fish hooks are pivotally connected with a pin 18 and the outer edges of the shanks are provided with barbs 19 and 20 that facilitate gripping the gills or portions of the mouth of a fish and with the shanks magnetized whereby the poles at the ends are oppositely disposed as indicated by the plus and minus signs in Figures 1 and 2 the shanks will move together as soon as tension is relieved in the fishing line which extends from a loop 21 that is trained through the eyes 16 and 17. A fishing line 22 is connected to a swivel 23 on which is an eye 24 through which the loop 21 extends.

Weights 25 and 26 from which eyes 27 and 28, respectively, extend depend from the eyes 16 and 17 with the material of the eyes 16 and 17 extended through the eyes 27 and 28.

The hooks 10 and 11 are provided with conventional barbs 29 and 30 that extend from points 31 and 32, respectively.

With the parts assembled as illustrated and described, a pair of pivotally connected fish hooks are carried by a loop 21 on the end of a fishing line with weights depending from eyes of the arms 14 and 15 at upper ends of shanks of the hooks and with the shanks held together by magnetism therein bait may be positioned on the hooks and the device used in the conventional manner.

Upon a fish striking the bait on a pair of hooks held together as shown in Figure 1, a jerk or pull on a fishing line extended from the loop 21 pulls the eyes 16 and 17 upwardly to the position shown in Figure 2 wherein the hooks 10 and 11 snap outwardly and are forced through the upper and lower jaws of a fish. By this means a fish is instantly caught and with the hooks being urged outwardly by a pull on the fishing line it will be substantially impossible for the fish to escape while being retrieved.

The device may be provided in different sizes and colors and any suitable bait may be used in combination with the hooks.

It will be understood that modifications, within the scope of the appended claims, may be made in the design and arrangement of the parts without departing from the spirit of the invention.

What is claimed is:

1. In a fishing device, the combination which comprises a pair of hooks having elongated substantially straight shanks and said shanks having right angularly disposed arms extended from upper ends thereof, means pivotally connecting the shanks of the hooks at points spaced from upper ends thereof and the ends of said arms having eyes thereon, a weight depending from each of the eyes at the ends of said arms, a loop trained through the eyes of the arms, and a fishing line connected to and extended from said loop, said shanks being magnetized whereby the magnetism draws the ends of the shanks on which the hooks are positioned together.

2. In a fishing device, the combination which comprises a pair of hooks having elongated substantially straight shanks and provided with barbs in the outer edges thereof; and said shanks having right angularly disposed arms extended from upper ends thereof, means pivotally connecting the shanks of the hooks at points spaced from upper ends thereof and the ends of said arms having eyes thereon, a weight depending from each of the eyes at the ends of said arms, a loop trained through the eyes of the arms, and a fishing line connected to and extended from said loop, said shanks, hooks, and arms being magnetized with the poles of the elements oppositely disposed whereby the magnetism urges the shank toward a closed position of the hook.

References Cited in the file of this patent
UNITED STATES PATENTS

| | | |
|---|---|---|
| 649,510 | Fredricks | May 15, 1900 |
| 1,069,093 | Faught | July 29, 1913 |
| 1,100,055 | Clark | June 16, 1914 |
| 2,233,863 | Driscoll | Mar. 4, 1941 |